US009343996B2

(12) United States Patent
Dourbal

(10) Patent No.: US 9,343,996 B2
(45) Date of Patent: May 17, 2016

(54) METHOD AND SYSTEM FOR TRANSMITTING VOLTAGE AND CURRENT BETWEEN A SOURCE AND A LOAD

(71) Applicant: Pavel Dourbal, Princeton Junction, NJ (US)

(72) Inventor: Pavel Dourbal, Princeton Junction, NJ (US)

(*) Notice: Subject to any disclaimer, the term of this patent is extended or adjusted under 35 U.S.C. 154(b) by 263 days.

(21) Appl. No.: 14/172,465

(22) Filed: Feb. 4, 2014

(65) Prior Publication Data

US 2015/0222198 A1    Aug. 6, 2015

(51) Int. Cl.
| | | |
|---|---|---|
| *G05F 1/32* | (2006.01) | |
| *G05F 1/33* | (2006.01) | |
| *G05F 1/335* | (2006.01) | |
| *G05F 1/34* | (2006.01) | |
| *G05F 1/38* | (2006.01) | |
| *H02M 7/06* | (2006.01) | |
| *H02M 1/32* | (2007.01) | |
| *H02M 5/10* | (2006.01) | |
| *H02M 5/12* | (2006.01) | |
| *H02M 5/06* | (2006.01) | |
| *H02M 7/217* | (2006.01) | |

(52) U.S. Cl.
CPC . *H02M 7/06* (2013.01); *G05F 1/32* (2013.01); *G05F 1/33* (2013.01); *G05F 1/335* (2013.01); *G05F 1/34* (2013.01); *G05F 1/38* (2013.01); *H02M 1/32* (2013.01); *H02M 5/06* (2013.01); *H02M 5/10* (2013.01); *H02M 5/12* (2013.01); *H02M 7/2173* (2013.01)

(58) Field of Classification Search
CPC ............... G05F 1/32; G05F 1/33; G05F 1/34; G05F 1/38; G05F 1/335; H02M 5/06; H02M 5/10; H02M 5/12; H02M 1/32
USPC ............................................................ 330/63
See application file for complete search history.

(56) References Cited

U.S. PATENT DOCUMENTS

| | | | | |
|---|---|---|---|---|
| 24,068 A | * | 5/1859 | Geyger ................. | E01D 15/133 14/14 |
| 2,399,185 A | * | 4/1946 | Hedding ................. | G05F 1/33 363/93 |
| 2,633,562 A | * | 3/1953 | Rocard .................... | G05F 1/32 323/232 |
| 2,675,513 A | * | 4/1954 | Malick .................... | H02P 7/30 318/513 |
| 2,706,765 A | * | 4/1955 | Lengvenis ............ | G05D 23/224 219/491 |
| 2,929,009 A | * | 3/1960 | James .................... | B66B 1/06 29/709 |
| 2,962,646 A | * | 11/1960 | Pell ...................... | H02P 7/0038 318/258 |
| 3,956,683 A | | 5/1976 | Popp | |
| 4,032,840 A | * | 6/1977 | Lebedev ............... | H01F 29/14 323/250 |
| 4,045,717 A | | 8/1977 | Fallon | |
| 4,339,792 A | | 7/1982 | Yasumura | |
| 4,414,491 A | | 11/1983 | Elliott | |
| 4,445,082 A | | 4/1984 | Roberge | |
| 4,460,954 A | | 7/1984 | Aiken | |

(Continued)

*Primary Examiner* — Timothy J Dole
*Assistant Examiner* — Ishrat Jamali
(74) *Attorney, Agent, or Firm* — Henry M. Feiereisen LLC.

(57) ABSTRACT

For transmitting voltage and current between a source and a load, a magnetic amplifier with a power winding connectable with the source and the load and with at least one control winding is provided, and current and voltage difference between the source and the load are controlled by applying a portion of a rectified source voltage to the at least one control winding of the magnetic amplifier, and applying a portion of a rectified load voltage to the at least one control winding of the magnetic amplifier to prevent the current from exceeding a level which can endanger the source and/or the load and to minimize the voltage difference between the source and the load.

15 Claims, 14 Drawing Sheets

(56) References Cited

U.S. PATENT DOCUMENTS

| | | | |
|---|---|---|---|
| 4,520,298 A * | 5/1985 | Abbondanti | G01R 19/25 318/490 |
| 4,689,592 A | 8/1987 | Walker | |
| 4,737,704 A | 4/1988 | Kalinnikov | |
| 4,853,611 A | 8/1989 | Kislovski | |
| 5,461,555 A | 10/1995 | Kitajima | |
| 6,154,019 A | 11/2000 | Valdemarsson | |
| 6,472,827 B1 | 10/2002 | Nilssen | |
| 6,483,726 B2 | 11/2002 | Chen | |
| 6,490,184 B2 | 12/2002 | Jiang | |
| 6,642,630 B2 | 11/2003 | Watanabe | |
| 6,686,826 B1 | 2/2004 | Hsu | |
| 6,784,781 B1 | 8/2004 | Collins | |
| 7,259,544 B2 | 8/2007 | Haugs | |
| 7,675,242 B2 | 3/2010 | Longhino | |
| 8,000,118 B1 | 8/2011 | Limpaecher | |
| 8,164,221 B2 | 4/2012 | Johansson | |
| 8,369,114 B2 | 2/2013 | Lin | |
| 8,482,944 B1 | 7/2013 | Fukuda | |
| 8,493,052 B2 | 7/2013 | Kim | |
| 8,564,919 B2 | 10/2013 | Vanderzon | |
| 8,570,779 B2 | 10/2013 | Dommaschk | |
| 8,582,267 B2 | 11/2013 | Pellegrino | |
| 8,587,284 B2 | 11/2013 | Djenguerian | |
| 8,599,576 B2 | 12/2013 | Faxvog | |
| 8,605,467 B2 | 12/2013 | Frattini | |
| 2010/0321106 A1 * | 12/2010 | Hsu | H03F 9/00 330/63 |

* cited by examiner

METHOD AND SYSTEM FOR TRANSMITTING VOLTAGE AND CURRENT BETWEEN A SOURCE AND A LOAD

BACKGROUND OF THE INVENTION

1. Technical Field

The present invention relates to methods and systems for transmitting voltage and current between a source and a load with the use of a magnetic amplifier connectable with the source and the load for voltage and current regulation.

2. Background Art

Methods and systems for transmitting voltage and current between a source and a load are known in the art. One of such methods and systems is disclosed in U.S. Pat. No. 8,605,467. In this patent a converter circuit is disclosed, which includes a transformer having a first side and a second side, a switch coupled to the first side of the transformer, a rectifying diode coupled to the second side of the transformer and to a first output terminal of the converter circuit, a clamping diode coupled to the second side of the transformer, to the rectifying diode, and to a second output terminal of the converter circuit. It may also include a boost section, a flyback section, an active clamp, and an isolated flyback section.

U.S. Pat. No. 8,599,576 discloses equipment and systems for protecting electronics against damage or upsets from electromagnetic pulse (HEMP or EMP), intentional electromagnetic interference (IEMI), and high power RF weapons. This equipment can include a shielding arrangement includes a metallic enclosure having an interior volume defining a protected portion and an unprotected portion separated by an electromagnetically shielding barrier, and having a portal providing access to the protective portion and including an access opening, a shielding cover sized to cover the access opening, and an electromagnetically sealing gasket positioned around a perimeter of the access opening. The shielding arrangement also includes one or more filters positioned at least partially within the unprotected portion and along the electromagnetically shielding barrier to dampen electromagnetic signals and/or power signals outside a predetermined acceptable range. In some cases, waveguides beyond cutoff are included, to provide passage of optical signals or airflow through the enclosure.

U.S. Pat. No. 8,587,284 discloses a power supply, which includes an energy transfer element, a switch, and a controller. The controller includes a modulator, a drive signal generator, a comparator, and a variable current limit generator. The modulator generates an enable signal having logic states responsive to a feedback signal. The drive signal generator either enables or skips enabling a switch of the power supply during a switching period in response to the logic state of the enable signal. The comparator asserts an over current signal to disable the switch if the switch current exceeds a variable current limit. The variable current limit generator sets the variable current limit to a first current limit in response to one logic state of the enable signal and sets the variable current limit to a second current limit if the enable signal transitions logic states and the over current signal is asserted during the switching period.

U.S. Pat. No. 8,582,267 discloses an in-rush current limiting system, which has a fast response time so that it can be used with power supplies that turn on and off rapidly. The system dissipates very little power during the normal mode of operation. This is achieved, in various embodiments, by connecting a regulator in series with a load capacitance and in parallel with the system load.

U.S. Pat. No. 8,570,779 discloses a device for converting an electric current, which has a phase module, which in turn has an alternating current connection and at least one direct current connection connected to an intermediate direct current circuit. The device further has an energy accumulator. A phase modulation path is formed between each direct current connection and each alternating current connection. Each phase modulation path has a series connection of submodules, which each have a power semiconductor. A semiconductor protective device is provided in parallel connection to power semiconductors of each submodule. A control unit actuates the semiconductor protective device, and energy accumulator(s) are equipped for supplying energy to the control unit. The device safely prevents damage from a short circuit on the direct-current side, even when the supply grid is connected, because a direct current connection of each phase module is connected to the intermediate direct current circuit via a direct-current switch.

U.S. Pat. No. 8,564,919 discloses a method and apparatus for detecting an overcurrent condition in a dimmer circuit having two switches, each for controlling power delivered to a load, each switch having a respective anti-parallel diode. The method comprises sensing a voltage drop across one of the anti-parallel diodes, comparing the sensed voltage drop with a reference voltage, and determining that an overcurrent condition exists if the sensed voltage drop exceeds the reference voltage. Also disclosed is a dimmer circuit embodying the method.

U.S. Pat. No. 8,493,052 discloses an apparatus and technique to drive a variable load via transformer secondary winding, where the primary of a transformer is driven at low voltages to provide high-voltage dynamic drive from the secondary to a load. A high-current source is placed in series with both the transformer secondary and load. At least secondary inductance of the transformer, hence impedance, is controlled through core saturation to transition secondary output to the load between high-voltage dynamic drive inductively coupled from the primary, and high-current drive serially connected through the secondary. Switching between high voltage and high current output is accomplished through the transformer; no additional switching devices need exist in the high-voltage path. Broad voltage and current capabilities of the configuration inexpensively improve transient drive of highly reactive loads.

U.S. Pat. No. 8,482,944 discloses an inrush protection circuit for an electronic ballast for powering HID lamps. A first resistor is positioned along a low potential side of the circuit and a switching element coupled in parallel with the first resistor. Second and third resistors are coupled in series and effective to receive DC input power from a DC source, with a first node between the second and third resistors further coupled to the gate of the switching element. A capacitor is coupled in parallel with the third resistor to provide a smoothed DC voltage to the gate of the switching element. A discharging circuit includes a diode and a fourth resistor coupled in series between the first node and the high potential side of the circuit, and is arranged to conduct discharging current from the capacitor until the voltage across the capacitor discharges below a predetermined voltage after the DC input power is removed from the circuit.

U.S. Pat. No. 8,369,114 discloses a power supply which employs an error detecting circuit to output an error signal when detecting an overvoltage or overcurrent occurred in one of output powers and which also employs a latch trigger circuit to cause the power supply to enter a latch mode when receiving the error signal. The power supply will keep the latch mode when entering the latch mode until the AC power VAC is removed. In addition, the power supply employs the error detecting circuit to provide the accurate safety threshold value by the constant current source with temperature compensation function and stable constant current output.

U.S. Pat. No. 8,164,221 discloses a control apparatus for a controlled series compensator including a plurality of reactance elements each having a rapid switch for connecting and disconnecting the reactance in series with an electric power transmission line. The apparatus also includes a steady state power flow controller. A damping controller is provides on the presence of an oscillation on the transmission line a first reactance insertion on the transmission line having a first duration of time trigged by a time instant that coincides with a peak in the power oscillation.

U.S. Pat. No. 8,000,118 discloses a method for delivering a controlled voltage, which involves, during a first electric pulse delivered to a primary transformer, holding a first switching section open to isolate the controlled voltage, where the first electric pulse creates a first magnetic flux in a core of the primary transformer, and where the first magnetic flux generates a direct current (DC) magnetizing current. The method further involves receiving the controlled voltage from a voltage source using the DC magnetizing current at a first switching section, and upon termination of the first electric pulse, closing the first switching section to deliver the controlled voltage to the primary transformer.

U.S. Pat. No. 7,675,242 discloses an electronic ballast for the operation of a lamp arrangement includes at least one lamp, in particular, a low-pressure discharge lamp and at least one transformer for balancing the lamp currents, whereby the transformer has two windings, provided for one or more lamps of the lamp arrangement. The transformer is embodied as a saturation balancing choke.

U.S. Pat. No. 7,259,544 discloses a method for compensation and symmetrization of a three-phase system with a single-phase. At least one variable inductor for connection to the three-phase system is employed in the method. The inductor's inductance is adjusted to obtain a resistive single-phase load and/or a three-phase load which draws balanced line currents. A device and a system for compensation and symmetrization by means of variable inductors is also provided.

U.S. Pat. No. 6,784,781 discloses an improved reactor and ballast system. The reactor includes a core having an I portion and a rolled portion which forms a core opening, a coil having an electrically insulated coil opening through which the I portion extends, and a spacer between the I portion and an edge of the rolled portion of the core. A portion of the coil extends into the core opening. The ballast system includes a core having a plurality of I portions and a rolled portion which form one or more core openings, a plurality of coils, each coil having an electrically insulated coil opening through which one of the I portions extends, and a plurality of spacers between the I portions and a first edge of the rolled portion and between the I portions and a second edge of the rolled portion. A portion of each coil extends into a corresponding core opening.

U.S. Pat. No. 6,686,826 discloses a transformer which includes a ferrite base plate having ferrite core between two grooves, two or more windings wound around the ferrite core and engaged in the grooves of the ferrite base plate and electrically coupled together and separated from each other, for forming two spaces in the grooves of the ferrite base plate and formed between the windings. One or more conductive panels may be engaged into each of the spaces of the ferrite base plate for reducing the voltage generated by the windings, and for supplying a stabilized electric power source to electric devices.

U.S. Pat. No. 6,642,630 discloses a multi-output switching power supply circuit which produces multiple outputs with increased power source conversion efficiency.

The circuit includes, in place of the rectifying diode and the commutating diode used in the multi-output switching power supply circuit of the prior art, a circuit configuration in which an NMOS for synchronous rectification is combined with a constant-voltage control by a magnetic amplifier. It is not required to use, for example, a radiator to dissipate heat, and hence the system size is reduced and the conversion efficiency is increased, and the system can be easily implemented in a low-voltage multi-output configuration. In a configuration in which a magnetic amplifier is arranged between a secondary winding and an first NMOS for synchronous rectification and a drive circuit for the first NMOS and an second NMOS for synchronous rectification is implemented as a separate winding other than the secondary winding, the first NMOS is not included in a loop to flow a reset current. The magnetic amplifier can conduct constant-voltage control without any influence from the interruption of the control loop when the first NMOS on the rectifying side is turned off.

U.S. Pat. No. 6,490,184 discloses a forward power converter which includes a transformer for transferring an input voltage from a primary side to a secondary side. The secondary side includes a main output voltage loop and at least one auxiliary output loop connected with a magnetic amplifier. A pulse width modulation (PWM) controller controls a switch on the primary side of the transformer for turning on the switch and turning off the main output voltage loop and the auxiliary output voltage loop for storing a magnetizing energy on windings of the secondary side. The magnetic amplifier includes a first and a second magnetization windings controlled by a first and a second control circuits respectively for providing a positive and negative magnetization current to carrying out a bi-directional magnetization process to achieve expanded load range operable for the forward power converter.

U.S. Pat. No. 6,483,726 discloses a flyback power converter which includes a transformer for transferring an input voltage from a primary side to a secondary side. The secondary side includes a main output voltage loop and at least one auxiliary output loop connected with a magnetic amplifier. A pulse width modulation (PWM) controller controls a switch on the primary side of the transformer for turning on the switch and turning off the main output voltage loop and the auxiliary output voltage loop for storing a magnetizing energy on windings of the secondary side. The PWM controller further turns off the switch and turning on the main output voltage loop for providing a main voltage output and for magnetizing the magnetic amplifier connected to the auxiliary output voltage loop. The magnetic amplifier functioning as an auxiliary-loop switch for turning on the auxiliary output voltage loop when the magnetic amplifier is saturated with magnetization and turning off the main voltage output voltage loop for providing an auxiliary output voltage. A time-shared energy transfer mechanism is provided between the main output voltage loop and the auxiliary output voltage loop to fully utilize the entire duty cycle.

U.S. Pat. No. 6,472,827 discloses a push-pull inverter supplied from an inductively current-limited DC voltage source by way of a center-tap on a transformer having significant inductance. This transformer inductance is parallel-coupled with a capacitance means. The inverter is made to self-oscillate through positive feedback provided by way of a saturable current transformer. The inverter frequency is determined by the saturation time of this current transformer, which saturation time is designed to be somewhat longer than the halfcycle period of the natural resonance frequency of the transformer inductance combined with the capacitance means. By controlling the length of this saturation time, the magnitude of the current provided to the fluorescent lamp is controlled, thereby permitting control of the light output in response to changes in the magnitude of the power line voltage.

U.S. Pat. No. 6,154,019 discloses a controllable inductor which comprises at least a tubular core, a main winding surrounding the core and a control winding passing substantially axially through the core. It is adapted for connection to a three phase alternating current network and has for this sake for each phase a main winding for connection to the phase, a core and a control winding, and the control windings of the three phases are electrically connected in series to each other.

U.S. Pat. No. 5,461,555 discloses a converter which is usable as a kind of DC-DC converter and which comprises a transformer for processing an exciting current into an excited current under influence of an inductance value of the transformer, the inductance value is controlled in compliance with a value of the exciting current. The exciting current is controlled by a current control circuit with reference to the excited current so that exciting current is intermittently supplied to the transformer. While the exciting current is absent during intermittent supply to the transformer, the transformer produces the excited current.

U.S. Pat. No. 4,853,611 discloses an inductive component for universal use in any electrical/electronic circuits, whose coefficient of self-induction (L) is independent of the signal, is constant, electrically controllable and can be varied significantly. The component comprises two mutually independent, identical ring-shaped and self-contained ferromagnetic cores which individually carry the partial windings of an induction winding and jointly carry a control winding. The direction of coiling of the windings is such that the magnetic fields produced by currents through the windings are mutually weakened, but in the other core they are reinforced. The component is connected via its induction winding to a controlled circuit, and via its control winding to a controlling circuit, or forms with its windings an element of this circuit. By varying the current via the control winding the controlling circuit controls the value of the coefficient of self-induction for the controlled circuit, a variation range of at least 1:100 being provided.

U.S. Pat. No. 4,737,704 discloses a variable-ratio transformer for arc and plasma setups, comprising a magnetic core made up of a main part composed of two yokes and legs in accordance with the number of phases and an additional part disposed on the side of the yoke of the main part of the magnetic core. The additional part of the magnetic core is made up of a yoke and legs whose number is equal to the number of the legs of the main part, at least one leg being placed with a gap in relation to the first yoke of the main part. The primary winding of each phase comprises two series-connected parts, the first part being located on the main part of the magnetic core, while the second part is located on the additional part thereof. A controlled electronic switch which regulates the load current flowing through the secondary winding of each phase, disposed on the main part of the magnetic core, is connected in parallel to one of the parts of the primary winding of each phase.

U.S. Pat. No. 4,689,592 discloses a single electromagnetic structure comprising a pair of assembled oppositely positioned pot cores, first and second winding means around each of the pedestals of the cores, and a flat magnetically permeable washer-like member positioned between the windings and spaced from the pedestals and the outer annular rim portions of the pot cores to define a pair of air gaps, whereby the apparatus functions like a transformer and an inductor in series with a winding of the transformer.

U.S. Pat. No. 4,460,954 discloses an improved ferroresonant transformer for a ferroresonant power supply, such as may be used for charging storage batteries, is provided by placing damping means, such as a strip of non-magnetic metallic material in an air gap of such a transformer, thereby eliminating the need for a damping resistor in the circuit of the resonant winding of such a transformer, thereby decreasing the size, weight, and cooling requirements of such a transformer and power supply, and allowing a greater electrical energy efficiency to be obtained.

U.S. Pat. No. 4,445,082 discloses a variable ratio transformer constructed around a control transformer comprising: two closed magnetic circuits each constructed around a ferromagnetic core. An alternating current magnetic field circulates in the first core and a direct current magnetic field circulates in the second core. The two circuits are located so as to define at least two common magnetic spaces in which the fields are superposed orthogonally. Around the first core is wound a primary winding, a secondary winding and, for a specific application in a three-phase circuit, a tertiary winding. A conventional transformer can be associated with the control transformer to reduce the load supported by the control transformer. The variable ratio transformer according to the invention can be used as a static balance compensator.

U.S. Pat. No. 4,414,491 discloses a power supply including a high frequency inverter circuit coupled to an electron discharge lamp load through a special purpose transformer. The transformer is wound on a saturable ferromagnetic core structure forming a first magnetic flux path coupling the primary and secondary windings of the transformer and a second shunt magnetic path including an air gap which carries and increasing share of flux as load current increases. The switching of the inverter circuit occurs in response to the partial saturation of the core. Auxiliary windings serially connected with the primary winding of the transformer and wound about the shunt magnetic path enhance the current regulating properties of the supply.

U.S. Pat. No. 4,339,792 discloses a voltage regulator using a saturable transformer which comprises a transformer having a primary and secondary windings, an AC power source for supplying the primary winding a fluctuating alternating current, and a rectifier connected to the secondary winding for rectifying an AC voltage derived therefrom to produce a DC output voltage. The transformer includes a core having four legs and two common portions magnetically joining the four legs, and a control winding supplied with DC control bias from a control circuit. The primary and secondary windings are wound on the first and second legs and the control winding is wound on the first and third legs.

U.S. Pat. No. 4,045,717 discloses a battery charging circuit for charging a battery load characterized by having a substantial effective capacitance, with a transformer connected in a Scott T configuration, the transformer input being adapted for connection to a three phase power line, and the transformer output circuit being in a four phase star configuration for providing a four phase charging circuit. The transformer additionally contains a pair of ferroresonant circuits, each such circuit containing a capacitance selected to cooperate with the capacitance of the battery so as to provide the desired charging characteristic.

U.S. Pat. No. 3,956,683 discloses an automatic taper charging battery charger having a power transformer and a series connected variable reactor, a pair of rectifiers powered by the transformer, a pair of output terminals coupled to one of the rectifiers, a sensing and control circuit powered by the other rectifier and responsive to the voltage of a battery connected to the output terminals for controlling the impedance of the variable reactor and in turn regulating the voltage developed across the power transformer and thereby controlling the current charging rate supplied to the battery.

SUMMARY OF THE INVENTION

Accordingly, it is an object of the present invention to provide a method and a system for voltage and current transmission between a source and a load, which is a further improvement of the existing methods and systems of this type.

In keeping with these objects and with others which will become apparent hereinafter, one feature of the present invention resides, briefly stated, in a method for transmitting voltage and current between a source and a load, comprising the steps of connecting a magnetic amplifier having a power winding and at least one control winding with the source and the load; and controlling current and voltage difference between the source and the load by applying a portion of a rectified source voltage to said at least one control winding of said magnetic amplifier and applying a portion of a rectified load voltage to said at least one control winding of said magnetic amplifier to prevent the current from exceeding a level which can endanger the source and/or the load and to minimize the voltage difference between the source and the load.

In accordance with another feature of the present invention said magnetic amplifier also has another control winding, and said applying includes applying a portion of a rectified source voltage to one of said control windings and applying a portion of a rectified load voltage to another of said control windings.

In accordance with a further feature of the present invention the method comprises obtaining a weighted sum of the portion of a rectified source voltage and the portion of a rectified load voltage and applying the weighted sum to said at least one control winding of the magnetic amplifier.

In accordance with a still further feature of present invention said applying a portion of a rectified source voltage and said applying a portion of a rectified load voltage are identical with each other so as to make the method symmetrical relative to the source and the load and therefore functioning in bidirectional manner when the source and the load perform opposite functions.

In accordance with another feature of the present invention said applying a portion of a rectified source voltage and said applying a portion of a rectified load voltage are carried out so as to provide similar or different current limits in different directions.

In accordance with an additional feature of the present invention the method operates for the source and the load which are of a three-phase four-wire type and a source neutral is connectable to a load neutral, or with the source and the load which are of a three-phase type, or with the source and the load which are of a symmetrical three-phase type.

In accordance with a further feature of the present invention the voltage of the source is a voltage selected from the group consisting of a voltage of a sinusoidal form, a voltage of a periodic form, a voltage having a limited frequency bandwidth, and a voltage having a period of $X^{-n}$ seconds, where X is equal to any positive value including 50, 60, or 400, and n is a positive value above zero.

The present invention also resides in a system for transmitting voltage and current between a source and a load, comprising a magnetic amplifier with a power winding connectable with the source and the load and with at least one control winding; and control means for controlling current and voltage difference between the source and the load, said control means including means for applying a portion of a rectified source voltage to said at least one control winding of said magnetic amplifier, and means for applying a portion of a rectified load voltage to said at least one control winding of said magnetic amplifier to prevent the current from exceeding a level which can endanger the source and/or the load and to minimize the voltage difference between the source and the load.

In accordance with another feature of the inventive system, said magnetic amplifier also has another control winding, wherein said means for applying a portion of a rectified source voltage is connected to one of said control windings, while said means for applying a portion of a rectified load voltage is connected to another of said control windings.

In accordance with a further feature of the inventive system said control means include voltage summation means obtaining a weighted sum of the portion of a rectified source voltage and the portion of a rectified load voltage to said at least one control winding of the magnetic amplifier.

In accordance with still a further feature of the inventive system said means for applying a portion of a rectified source voltage and said means for applying a portion of a rectified load voltage are identical with each other so as to make the system symmetrical relative to the source and the load and therefore functioning in bidirectional manner when the source and the load perform opposite functions.

In accordance with an additional feature of the inventive system said means for applying a portion of a rectified source voltage and said means for applying a portion of a rectified load voltage are constructed so as to provide similar or different current limits in different directions.

In accordance with still another feature of the inventive system it is connectable to the source and the load which are of a three-phase four-wire type and a source neutral is connectable to a load neutral or is connectable to the source and the load which are of a three-phase type, or is connectable to the source and the load which are of a symmetrical three-phase type.

The novel features of the present invention are set forth in particular in the appended claims. The invention itself, however, will be best understood from the following description of the preferred embodiments, which is accompanied by the following drawings.

DESCRIPTION OF THE PREFERRED EMBODIMENTS

Figure 1:
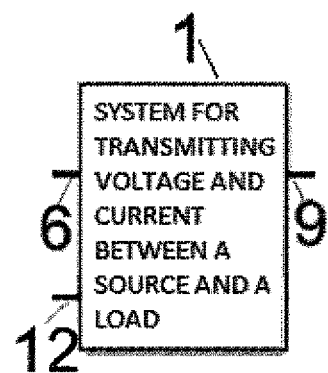
FIG. 1 Is a general view of a system for transmitting voltage and current between a source and a load in accordance with the presented invention, in which a method for transmitting voltage and current between a source and a load according to the present invention is implemented.

A system 1 for transmitting voltage and current between a source and a load shown on FIGS. 1-6 has a magnetic amplifier 2 with a power winding connectable with the source and the load and with at least one control winding. It further has control means for controlling current and voltage difference between the source and the load which include means 3 for applying a portion of a rectified source voltage to the at least one control winding of the magnetic amplifier 2 and means 4 for applying a portion of a rectified load voltage to the at least one control winding of the magnetic amplifier 2. The control means prevent the current from exceeding a level which can endanger the source and/or the load and to minimize the voltage difference between the source and the load.

It is also possible that the magnetic amplifier has another control winding, in which case the means 3 for applying a portion of a rectified source voltage can be connected to one of the control windings and then the means 4 for applying a portion of a rectified load voltage is connected to another of the control windings.

The control means can include voltage summation means 5 obtaining a weighted sum of the portion of a rectified source voltage and the portion of a rectified load voltage and applying the weighted sum to the at least one control winding of the magnetic amplifier 2.

Figure 2:
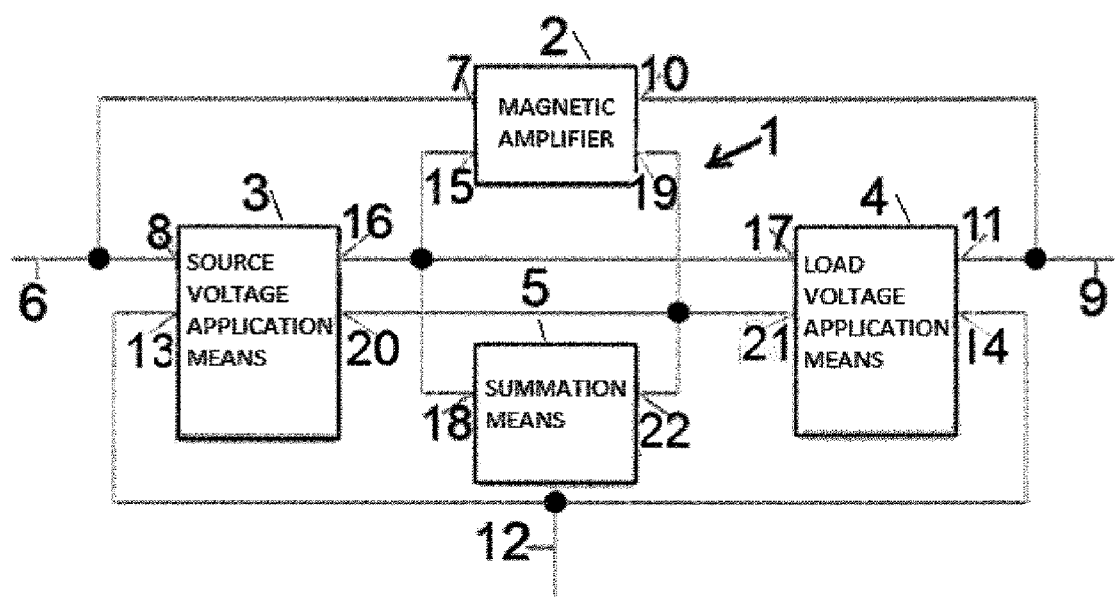
FIG. 2 Is a detailed view of the internal structure of the system illustrated in FIG. 1.
Figure 3:
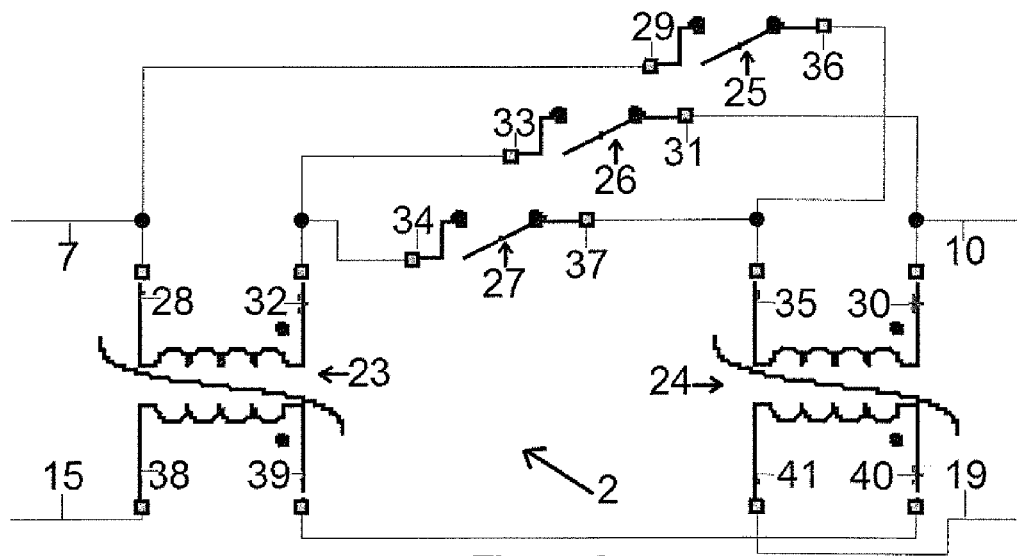
FIG. 3 Is a more detailed view of the internal structure of the magnetic amplifier illustrated in FIG. 2.
Figure 4:
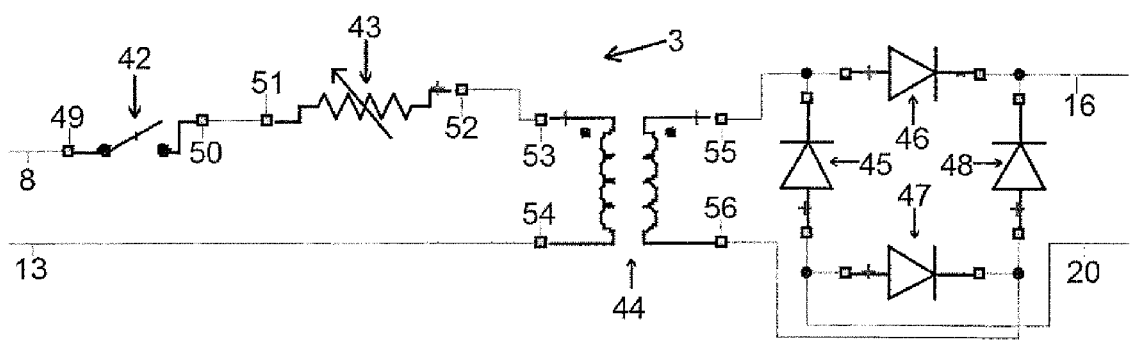
FIG. 4 Is a more detailed view of the internal structure of the means for applying a portion of a rectified source voltage to the control winding of the magnetic amplifier illustrated in FIG. 2.
Figure 5:
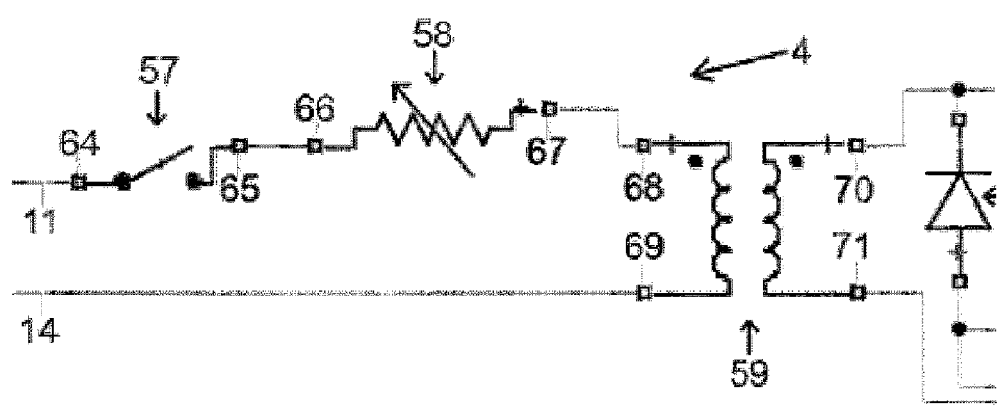
FIG. 5 Is a more detailed view of the internal structure of the means for applying a portion of a rectified load voltage to the at least one control winding of the magnetic amplifier illustrated in FIG. 2.
Figure 6:
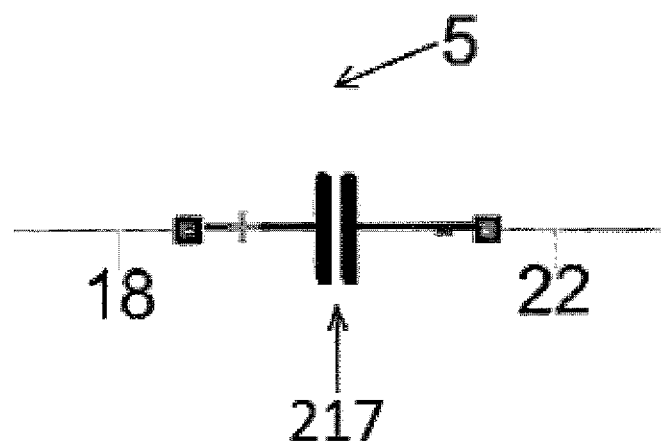
FIG. 6 Is a more detailed view of the internal structure of the voltage summation means illustrated in FIG. 2.

The means 3 for applying a portion of a rectified source voltage and the means 4 for applying a portion of a rectified load voltage can be identical with each other as shown in FIG. 2 so as to make the system symmetrical relative to the source and the load and therefore functioning in bidirectional manner when the source and the load perform opposite functions.

The means 3 for applying a portion of a rectified source voltage and the means 4 for applying a portion of a rectified load voltage can be constructed so as to provide similar or different current limits in different directions.

Figure 7:
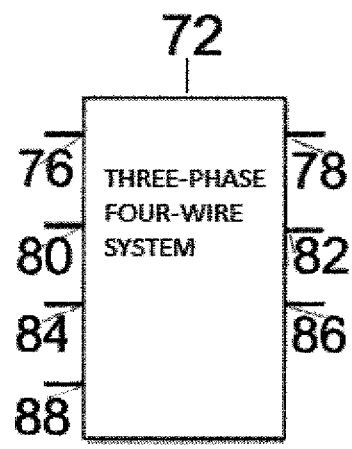
FIG. 7 Is a general view of the system in accordance with another embodiment of the presented invention for an environment where wiring type is three-phase with a neutral conductor.
Figure 8:
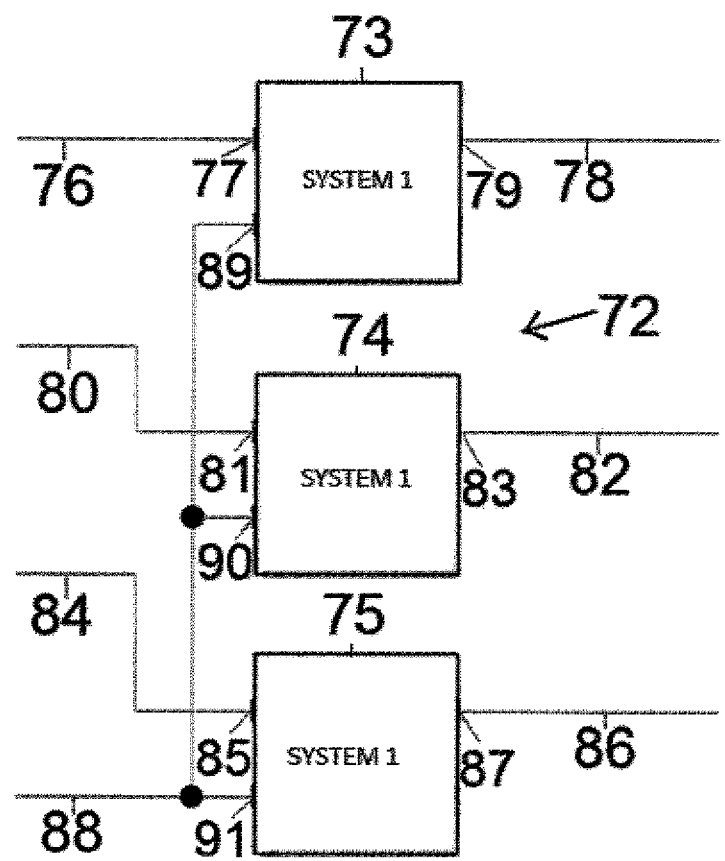
FIG. 8 Is a detailed view of the internal structure of the system illustrated in FIG. 7.
Figure 9:
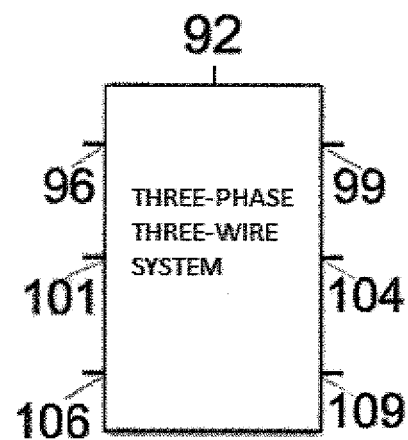
FIG. 9 Is a general view of the system in accordance with a further embodiment of the present invention implemented for three-phase electrical wiring environment.
Figure 10:
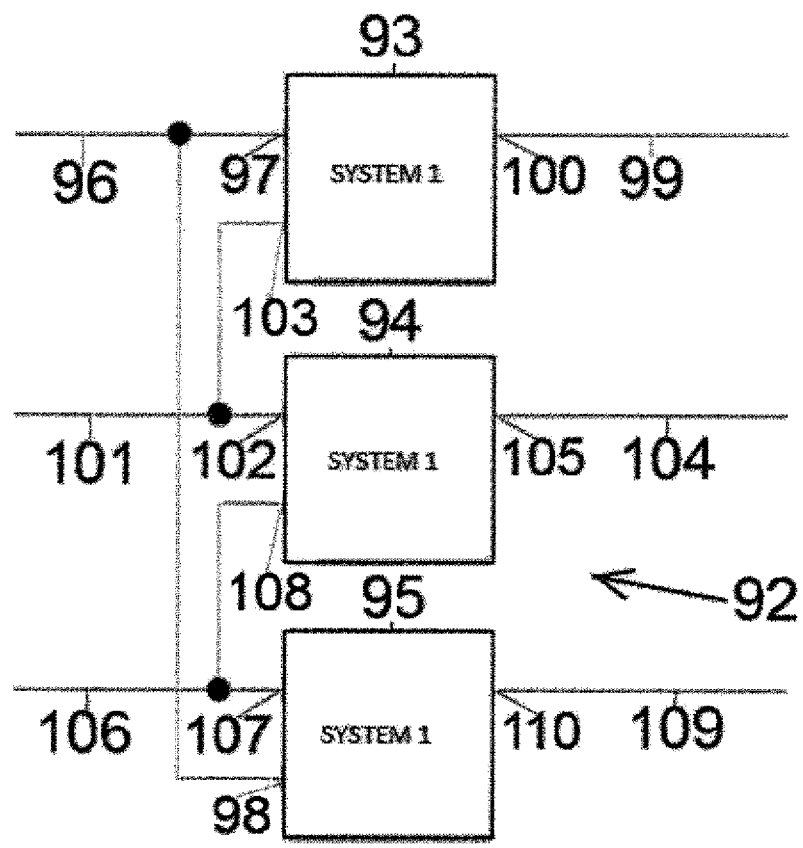
FIG. 10 Is a detailed view of the internal structure of the system illustrated in FIG. 9.
Figure 11:
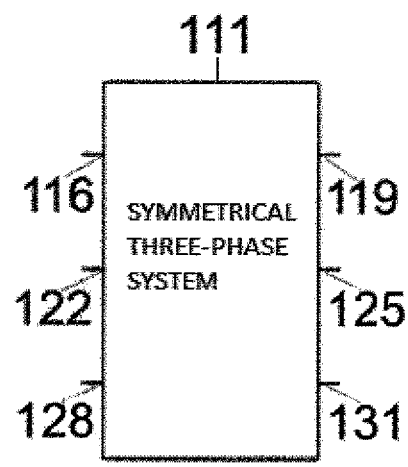
FIG. 11 is a general view of the system in accordance with an additional embodiment of the present invention implemented for symmetrical three-phase sources and loads.
Figure 12:
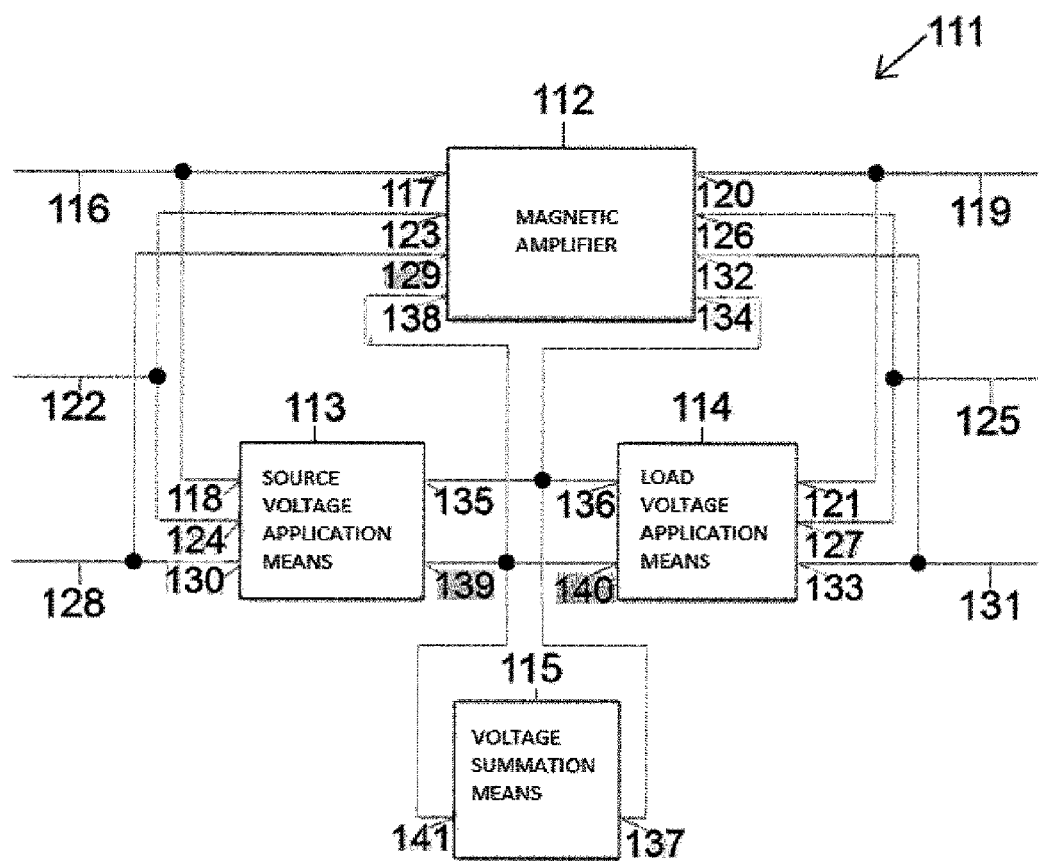
FIG. 12 Is a detailed view of the internal structure of the system illustrated in FIG. 11.
Figure 13:
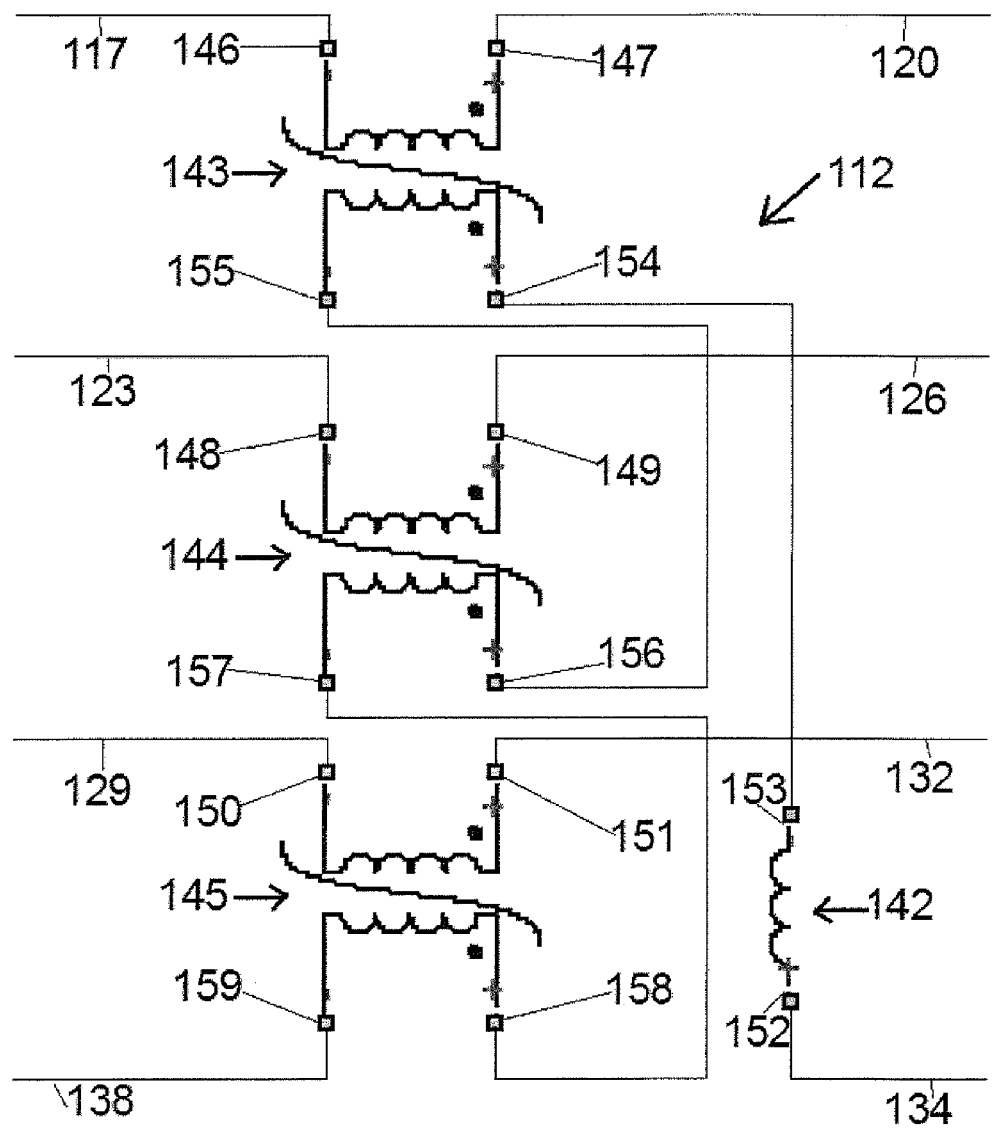
FIG. 13 Is a more detailed view of the internal structure of the magnetic amplifier illustrated in FIG. 12.
Figure 14:
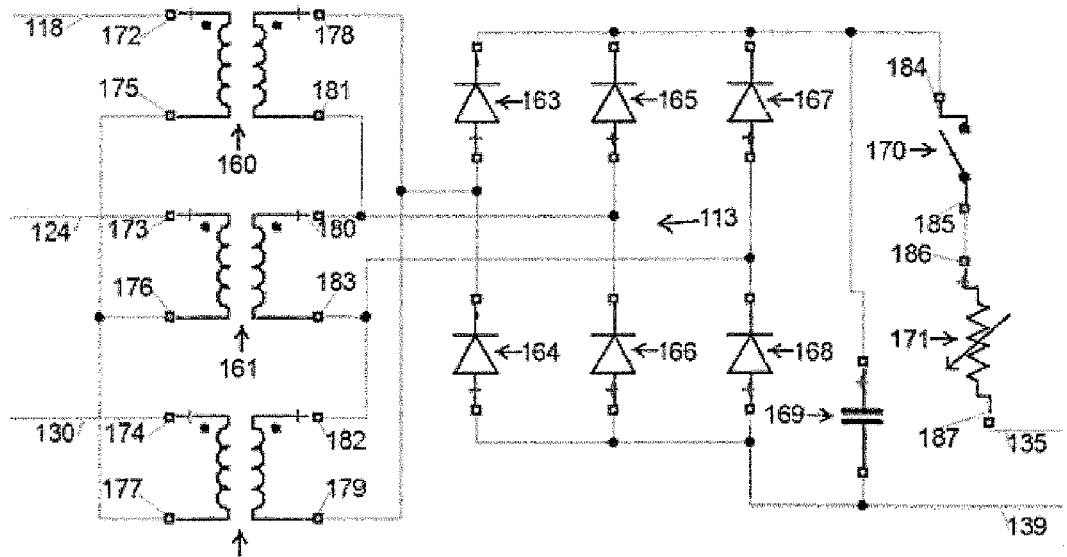
FIG. 14 Is a more detailed view of the internal structure of the means for applying a portion of a rectified source voltage to the control winding of the magnetic amplifier illustrated in FIG. 12.
Figure 15:
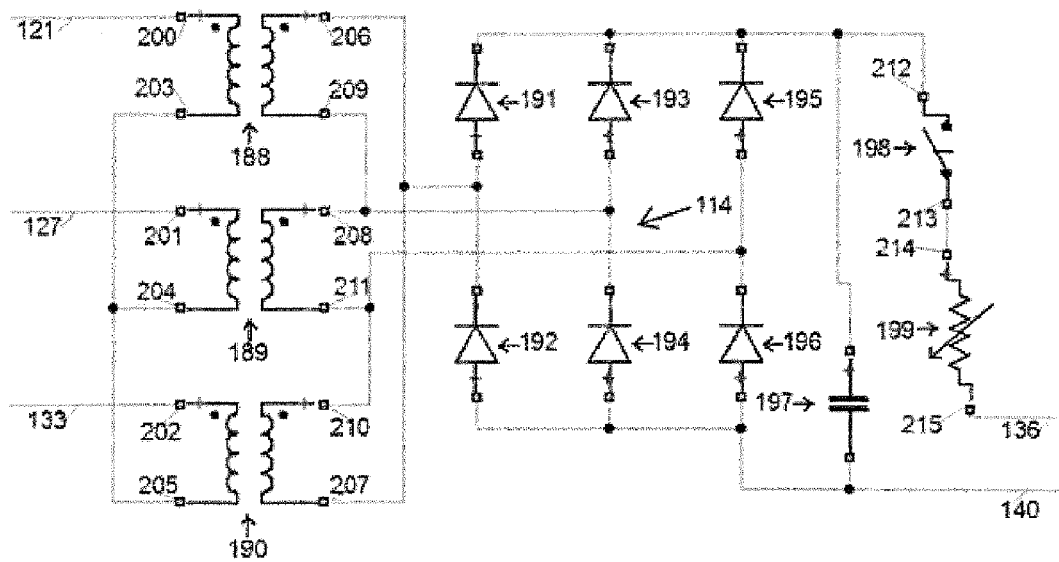
FIG. 15 Is a more detailed view of the internal structure of the means for applying a portion of a rectified load voltage to the at least one control winding of the magnetic amplifier illustrated in FIG. 12.
Figure 16:
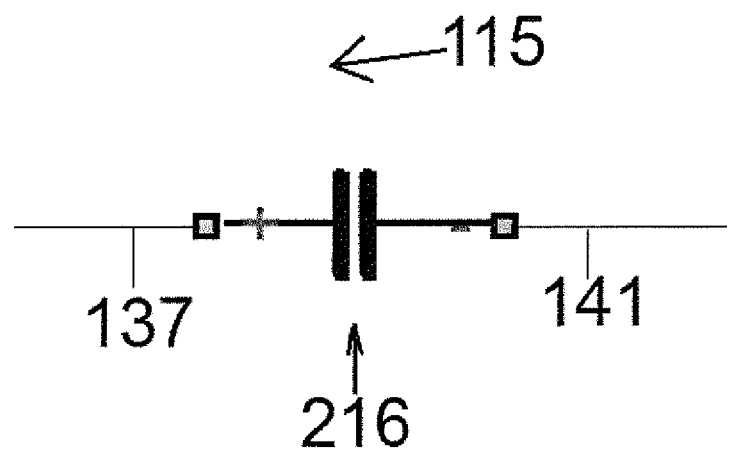
FIG. 16 Is a more detailed view of the internal structure of the voltage summation means illustrated in FIG. 12.

The system can be connectable to the source and the load which are of a three-phase four-wire type where a source neutral is connectable to a load neutral as shown in FIGS. 7 and 8, or is connectable to the source and the load which are of a three-phase type as shown in FIGS. 9 and 10, or is connectable to the source and the load which are of a symmetrical three-phase type as shown in FIGS. 11-16.

The components described above are connected in the following way. A first connector 6 of the system 1 is connected to a first connector 7 of the magnetic amplifier 2 and to a first connector 8 of the means 3. A second connector 9 of the system 1 is connected to a second connector 10 of the magnetic amplifier 2 and to a first connector 11 of the means 4. A common connector 12 of the system 1 is connected to a second connector 13 of the means 3 and to a second connector 14 of the means 4. A third connector 15 of the magnetic amplifier 2 is connected to a third connector 16 of the means 3, a third connector 17 of the means 4, and a first connector 18 of the means 5. A fourth connector 19 of the means 2 is connected to a fourth connector 20 of the means 3, a fourth connector 21 of the means 4, and the second connector 22 of the means 5.

In the system in accordance with the present invention, the magnetic amplifier 2 includes two identical saturable transformers 23 and 24, and three switches 25, 26, and 27.

The components of the magnetic amplifier 2 are connected in the following way. The first connector 7 of the magnetic amplifier 2 is connected to a first connector 28 of a first winding of the transformer 23 and to a first connector 29 of the switch 25. The second connector 10 of the magnetic amplifier 2 is connected to a second connector 30 of a first winding of the transformer 24 and to a second connector 31 of the switch 26. A second connector 32 of the first winding of the transformer 23 is connected to a first connector 33 of the switch 26 and to a first connector 34 of the switch 27. A first connector 35 of the first winding of the transformer 24 is connected to a second connector 36 of the switch 25 and to a second connector 37 of the switch 27. A first connector 38 of the second winding of the transformer 23 is connected to the third connector 15 of the magnetic amplifier 2. A second connector 39 of the second winding of the transformer 23 is connected to a second connector 40 of the second winding of the transformer 24. A first connector 41 of the second winding of the transformer 24 is connected to the fourth connector 19 of the magnetic amplifier 2. The first windings of the transformers 23 and 24 with the use of the switches 25-27 can be connected in series when the switches 25 and 26 are open and the switch 27 is closed, or parallel to each other when the switches 25 and 26 are closed and the switch 27 is open. The first windings of the transformers 23 and 24 together form the power winding of the magnetic amplifier 2, while the second windings of the transformers 23 and 24 together form the control winding of the magnetic amplifier 2. The transformers 23 and 24 are saturable transformers.

Further in accordance with the present invention, the means 3 comprise a switch 42, a rheostat 43, a transformer 44, and a rectifier including diodes 45-48. The transformer 44 can be a variable transformer or autotransformer. However the means 3 do not necessarily include the components 42-44.

The components of the means 3 are connected in the following way. A first connector 49 of the switch 42 is connected to the first connector 8 of the means 3. A second connector 50 of the switch 42 is connected to a first connector 51 of the rheostat 43. A second connector 52 of the rheostat 43 is connected to a first connector 53 of a first winding of the transformer 44. A second connector 54 of the first winding of the transformer 44 is connected to the second connector 13 of the means 3. A first connector 55 of a second winding of the transformer 44 is connected to a cathode of the diode 45 and to an anode of the diode 46. A second connector 56 of the second winding of the transformer 44 is connected to a cathode of the diode 47 and to an anode of the diode 48. Cathodes of the diodes 46 and 48 are connected to the third connector 16 of the means 3. Anodes of the diodes 45 and 47 are connected to the fourth connector 20 of the means 3.

Further in accordance with the present invention, the means 4 comprise a switch 57, a rheostat 58, a transformer 59, and a rectifier including diodes 60-63. The transformer 59 can be a variable transformer or autotransformer. However the means 4 do not necessarily include the components 57-59.

The components of the means 4 are connected in the following way. A first connector 64 of the switch 57 is connected to the first connector 11 of the means 4. A second connector 65 of the switch 57 is connected to a first connector 66 of the rheostat 58. A second connector 67 of the rheostat 58 is connected to a first connector 68 of a first winding of the transformer 59. A second connector 69 of the first winding of the transformer 59 is connected to the second connector 14 of the means 4. A first connector 70 of a second winding of the transformer 59 is connected to a cathode of the diode 60 and to an anode of the diode 61. A second connector 71 of the second winding of the transformer 59 is connected to a cathode of the diode 62 and to an anode of the diode 63. Cathodes of the diodes 61 and 63 are connected to the third connector 17 of the means 4. Anodes of the diodes 60 and 62 are connected to the fourth connector 21 of the means 4.

In the inventive system 1 a capacitor 217 carries out the functions of the means 5. Positive and negative leads of the capacitor 217 are at the same time the first 18 and the second 22 connectors of the means 5.

A three-phase four-wire system 72 shown in FIGS. 7 and 8 includes three single-phase systems 73, 74, and 75, all identical to the system 1.

The components of the system 72 are connected in the following way. A first phase "A" connector 76 of the system 72 is connected to a first connector 77 of the system 73. A second phase "A" connector 78 of the system 72 is connected to a second connector 79 of the system 73. A first phase "B" connector 80 of the system 72 is connected to a first connector 81 of the system 74. A second phase "B" connector 82 of the system 72 is connected to a second connector 83 of the system 74. A first Phase "C" connector 84 of the system 72 is connected to a first connector 85 of the system 75. A second Phase "C" connector 86 of the system 72 is connected to a second connector 87 of the system 74. A neutral connector 88 of the system 72 is connected to common connectors 89, 90, and 91 of the systems 73, 74, and 75.

A three-phase three-wire system 92 shown in FIGS. 9 and 10 includes three systems 93, 94, and 95, all identical to the single phase system 1.

The components of the system 92 are connected in the following way. A first phase "A" connector 96 of the system 92 is connected to a first connector 97 of the system 93 and to a common connector 98 of the system 95. A second phase "A" connector 99 of the system 92 is connected to a second connector 100 of the system 93. A first phase "B" connector 101 of the system 92 is connected to a first connector 102 of the system 94 and to a common connector 103 of the system 93. A second phase "B" connector 104 of the system 92 is connected to a second connector 105 of the system 94. A first phase "C" connector 106 of the system 92 is connected to a first connector 107 of the system 95 and to a common connector 108 of the system 94. A second phase "C" connector 109 of the system 92 is connected to a second connector 110 of the system 95.

A symmetrical three-phase system 111 for transmitting voltage and current between a source and a load shown on FIGS. 11-16 has a magnetic amplifier 112 with a power winding connectable with the source and the load and with at least one control winding. It further has control means for controlling current and voltage difference between the source and the load which include means 113 for applying a portion of a rectified source voltage to the at least one control winding of the magnetic amplifier 112 and means 114 for applying a portion of a rectified load voltage to the at least one control winding of the magnetic amplifier 112.

It is also possible that the magnetic amplifier has another control winding, in which case the means 113 for applying a portion of a rectified source voltage can be connected to one of the control windings and then the means 114 for applying a portion of a rectified load voltage is connected to another of the control windings.

The control means can include voltage summation means 115 obtaining a weighted sum of the portion of a rectified source voltage and the portion of a rectified load voltage and applying the weighted sum to the at least one control winding of the magnetic amplifier 112.

The means 113 for applying a portion of a rectified source voltage and the means 114 for applying a portion of a rectified load voltage can be identical with each other as shown in FIG. 8 so as to make the system symmetrical relative to the source and the load and therefore functioning in bidirectional manner when the source and the load perform opposite functions.

The means 113 for applying a portion of a rectified source voltage and the means 114 for applying a portion of a rectified load voltage can be constructed so as to provide similar or different current limits in different directions.

The components of the system 111 are connected in the following way. A first phase "A" connector 116 of the system 111 is connected to a first phase "A" connector 117 of the magnetic amplifier 112 and to a first phase "A" connector 118 of the means 113. A second phase "A" connector 119 of the system 111 is connected to a second phase "A" connector 120 of the magnetic amplifier 112 and to a first phase "A" connector 121 of the means 114. A first phase "B" connector 122 of the system 111 is connected to a first phase "B" connector 123 of the magnetic amplifier 112 and to a first phase "B" connector 124 of the means 113. A second phase "B" connector 125 of the system 111 is connected to a second phase "B" connector 126 of the magnetic amplifier 112 and to a first phase "B" connector 127 of the means 114. A first phase "C" connector 128 of the system 111 is connected to a first phase "C" connector 129 of the magnetic amplifier 112 and to a first phase "C" connector 130 of the means 113. A second phase "C" connector 131 of the system 111 is connected to a second phase "C" connector 132 of the magnetic amplifier 112 and to a first phase "C" connector 133 of the means 114. A first control connector 134 of the magnetic amplifier 112 is connected to positive outputs 135 and 136 of the means 113 and 114 and a positive connector 137 of the means 115. A second control connector 138 of the magnetic amplifier 112 is connected to negative outputs 139 and 140 of the means 113 and 114 and a negative connector 141 of the means 115.

In the system 111 in accordance with this embodiment of the present invention, the magnetic amplifier 112 includes an inductor 142 and three identical saturable transformers 143, 144 and 145.

The components of the magnetic amplifier 112 are connected in the following way. A first phase "A" connector 117 of the magnetic amplifier 112 is connected to a first connector 146 of a first winding of the transformer 143. A second phase "A" connector 120 of the magnetic amplifier 112 is connected to a second connector 147 of the first winding of the transformer 143. A first phase "B" connector 123 of the magnetic amplifier 112 is connected to a first connector 148 of a first winding of the transformer 144. The second phase "B" connector 126 of the magnetic amplifier 112 is connected to a second connector 149 of the first winding of the transformer 144. A first phase "C" connector 128 of the magnetic amplifier 112 is connected to a first connector 150 of a first winding of the transformer 145. A second phase "C" connector 131 of the magnetic amplifier 112 is connected to a second connector 151 of the first winding of the transformer 145. A first control connector 134 of the magnetic amplifier 112 is connected to a first connector 152 of the inductor 142. A second connector 153 of the inductor 142 is connected to a second connector 154 of the second winding of the transformer 143. A first connector 155 of the second winding of the transformer 143 is connected to a second connector 156 of a second winding of the transformer 144. A first connector 157 of the second winding of the transformer 144 is connected to a second connector 158 of a second winding of the transformer 145. A first connector 159 of the second winding of the transformer 145 is connected to the second control connector 138 of the magnetic amplifier 112.

Further, the means 113 has a three-phase transformer formed by one-phase transformers 160-162 and a three-phase rectifier including diodes 163-168, a capacitor 169, a switch 170, and a rheostat 171. The three-phase transformer can be a fixed turn ratio or a variable transformer or an autotransformer with all its windings connected independently in delta or star configurations. The three-phase transformer and components 169-171 can be omitted.

The components of the means 113 are connected in the following way. A first phase "A" connector 118 of the means 113 is connected to a first connector 172 of a primary winding of the transformer 160. A first phase "B" connector 124 of the means 113 is connected to a first connector 173 of a primary winding of the transformer 161. A first phase "C" connector 128 of the means 113 is connected to a first connector 174 of a primary winding of the transformer 162. Second connectors 175-177 of the primary windings of the transformers 160-162 are connected with each other. A first connector 178 of a secondary winding of the transformer 160, a second connector 179 of a secondary winding of the transformer 162, an anode of the diode 163 and a cathode of the diode 164 are connected to each other. A first connector 180 of a secondary winding of the transformer 161, a second connector 181 of the secondary winding of the transformer 160, an anode of the diode 165 and a cathode of the diode 166 are connected to each other. A first connector 182 of a secondary winding of the transformer 162, a second connector 183 of the secondary winding of the transformer 161, an anode of the diode 167 and a cathode of the diode 168 are connected to each other. Cathodes of the diodes 163, 165 and 167 and a positive lead of the capacitor 169 are connected to a first connector 184 of the switch 170. A second connector 185 of the switch 170 is connected to a first connector 186 of the rheostat 171. A second connector 187 of the rheostat 171 is connected to the positive output 135 of the means 113. Anodes of the diodes 164, 166 and 168 and a negative lead of the capacitor 169 are connected to the negative output 139 of the means 113.

Further, the means 114 has a three-phase transformer formed by one-phase transformers 188-190 and a three-phase rectifier including diodes 191-196, a capacitor 197, a switch 198, and a rheostat 199. The three-phase transformer can be a fixed turn ratio or a variable transformer or an autotransformer with all its windings connected independently in delta or star configurations. The three-phase transformer and components 197-199 can be omitted.

The components of the means 114 are connected in the following way. A first phase "A" connector 121 of the means 114 is connected to a first connector 200 of a primary winding of the transformer 188. A first phase "B" connector 127 of the means 114 is connected to a first connector 201 of a primary winding of the transformer 189. A first phase "C" connector 133 of the means 114 is connected to a first connector 202 of a primary winding of the transformer 190. Second connectors 203-205 of the primary windings of the transformers 188-190 are connected with each other. A first connector 206 of a secondary winding of the transformer 188, a second connector 207 of a secondary winding of the transformer 190, an anode of the diode 191 and a cathode of the diode 192 are connected to each other. A first connector 208 of a secondary winding of the transformer 189, a second connector 209 of the secondary winding of the transformer 188, an anode of the diode 193 and a cathode of the diode 194 are connected to each other. A first connector 210 of a secondary winding of the transformer 190, a second connector 211 of the secondary winding of the transformer 189, an anode of the diode 195 and a cathode of the diode 196 are connected to each other. Cathodes of the diodes 191, 193, and 195 and a positive lead of the capacitor 197 are connected to a first connector 212 of the switch 198. A second connector 213 of the switch 198 is connected to a first connector 214 of the rheostat 199. A second connector 215 of the rheostat 199 is connected to the positive output 136 of the means 114. Anodes of the diodes 192, 194 and 196 and a negative lead of the capacitor 197 are connected to the negative output 140 of the means 114.

In this embodiment a capacitor 216 carries out the functions of the means 115. Positive and negative leads of the capacitor 216 are at the same time the positive 137 and the negative 141 connectors of the means 115.

In the inventive system and method, if the current is flowing from the source to the load, it is limited by applying the portion of a rectified source voltage to the control winding of the magnetic amplifier, and if the current flows from the load to the source, it is limited by applying the portion of a rectified load voltage to the control winding of the magnetic amplifier.

In the inventive system and method, the voltage of the source can be of a sinusoidal form, or of a periodic form, or can have a limited frequency bandwidth The source voltage period can be $X^{-n}$ seconds long, where X is equal to any positive value including 50, 60, or 400, and n is a positive value above zero.

The method in accordance with the present invention is implemented during the operation of the inventive system in the following manner:

During the operation the load impedance can episodically change from zero (short circuit condition) to infinity (open circuit condition). The source is supplying an AC voltage which is applied to the load of variable impedance through the power windings of the magnetic amplifier 2, 112. The magnetic amplifier 2, 112 and the load together act as a voltage divider, so that if the impedance of the load is low, then to limit the current it is necessary to proportionally increase the impedance of the magnetic amplifier. At the same time, when the load impedance increases, the current will not increase significantly even when the impedance of the magnetic amplifier is low, but the voltage across the load can be significantly higher if the magnetic amplifier 2, 112 is at its highest saturation and its impedance is at its lowest point, even though at such state it will not be able to limit the current through the low impedance load. The control current circulating through the control winding of the magnetic amplifier 2, 112 is a sum of the DC currents formed by the means 3, 113 and the means 4, 114. The control current formed by the means 3, 113 is proportional to the amplitude value of the source voltage which at the same time is equivalent to the sum of the voltage across the power winding of the magnetic amplifier 2, 112 and across the load. The control current formed by the means 4, 114 is proportional to the amplitude value of the voltage across the load. When the load impedance is at or near its lowest extreme value, the control current of the magnetic amplifier 2, 112 is only supplied by the means 3, 113 because the voltage across the load is equal or close to zero and therefore the DC current at the output of the means 4, 114 is also equal or close to 0. At this moment the control current is minimal and therefore the magnetic amplifier 2, 112 is at its minimum saturation so that its impedance is at its maximum defined solely by the settings of the means 3, 113. At this condition the current through the load, even though the load impedance is low, is defined by the impedance of the magnetic amplifier 2, 112. As soon as the load impedance becomes higher, the voltage across the load increases, and therefore the DC current provided by the means 4, 114 increases and adds to the total control current of the control winding of the magnetic amplifier 2, 112 so as its saturation becomes higher and its impedance decreases proportionally to impedance increase of the load which leads to a further increase of the current through the load and therefore additional significant increase of the voltage across the load with proportional decrease of the voltage across the magnetic amplifier 2, 112. At the same time, even though the magnetic amplifier cannot theoretically limit the current in this state, it is not necessary since the current is limited by the load itself which has a high enough impedance. It is to be understood that this method as a result prevents the current from exceeding a level which can endanger the source and/or the load and minimizes the voltage difference between the source and the load.

The new method and system according to the present invention, due to its unique energy transfer characteristics, can be used in many areas. They can be used for example, in:

Gliding arc and other types of plasma generation in gases and liquids for plasma and arc welding, cutting, waist utilization, water treatment, disinfection, decontamination, biological, medical, and other similar systems;

Electric motor control systems for limiting in-rush current;

Battery and capacitor chargers;

Ballasts and dimmers for light emitted diodes, luminescent and other type gas discharge and electron discharge lamps;

Electroplating and similar electrochemical processes used in industry, research and art;

Electrical fault protection systems with automatic restoration of power;

Electrical potential equalization and bonding of metal gas or fuel pipe by its connecting to ground electrode through the proposed system tuned to provide low impedance for current flowing from the pipe to the ground electrode and high impedance for current flowing in the opposite direction, so that the excessive potential increase on the pipe could be quickly discharged to ground, but no excessive electrical charge caused by, for example, a lightning strike, could penetrate from the grounding electrode to the pipe and cause its damage or explosion.

The above listed areas of use are presented here only as some examples of possible use of the present invention and other areas of use of the present invention are possible as well.

The present invention is not limited to the details shown since further modifications and structural changes are possible without departing from the main spirit of the present invention.

What is desired to be protected by Letters Patent is set forth in particular in the appended claims.

I claim:

1. A method for transmitting voltage and current between a source and a load, comprising the steps of:

connecting a magnetic amplifier having a power winding and at least one control winding with the source and the load;

controlling current and voltage difference between the source and the load by applying a portion of a rectified source voltage to said at least one control winding of said magnetic amplifier;

applying a portion of a rectified load voltage to said at least one control winding of said magnetic amplifier to prevent the current from exceeding a level which can endanger the source and/or the load and to minimize the voltage difference between the source and the load; and obtaining a weighted sum of the portion of a rectified source voltage and the portion of a rectified load voltage and applying the weighted sum to said at least one control winding of the magnetic amplifier.

2. A method as defined in claim 1, wherein said magnetic amplifier also has another control winding, wherein said applying includes applying a portion of a rectified source voltage to one of said control windings and applying a portion of a rectified load voltage to another of said control windings.

3. A method as defined in claim 1, wherein said applying a portion of a rectified source voltage and said applying a portion of a rectified load voltage are identical with each other so as to make the method symmetrical relative to the source and the load and therefore functioning in bidirectional manner when the source and the load perform opposite functions.

4. A method as defined in claim 1, wherein said applying a portion of a rectified source voltage and said applying a portion of a rectified load voltage are carried out so as to provide similar or different current limits in different directions.

5. A method as defined in claim 1, wherein the method operates for the source and the load which are of a three-phase four-wire type and a source neutral is connectable to a load neutral.

6. A method as defined in claim 1, wherein the method operates with the source and the load which are of a three-phase type.

7. A method as defined in claim 1, wherein the system operates with the source and the load which are of a symmetrical three-phase type.

8. A method as defined in claim 1, wherein the voltage of the source is a voltage selected from the group consisting of a voltage of a sinusoidal form, a voltage of a periodic form, a voltage having a limited frequency bandwidth, and a voltage having a period of $X^{-n}$ seconds, where X is equal to any positive value including 50, 60, or 400, and n is a positive value above zero.

9. A system for transmitting voltage and current between a source and a load, comprising:

a magnetic amplifier with a power winding connectable with the source and the load and with at least one control winding;

control means for controlling current and voltage difference between the source and the load, said control means including means for applying a portion of a rectified source voltage to said at least one control winding of said magnetic amplifier; and means for applying a portion of a rectified load voltage to said at least one control winding of said magnetic amplifier to prevent the current from exceeding a level which can endanger the source and/or the load and to minimize the voltage difference between the source and the load, wherein said control means include voltage summation means obtaining a weighted sum of the portion of a rectified source voltage and the portion of a rectified load voltage to said at least one control winding of the magnetic amplifier.

10. A system as defined in claim 9, wherein said magnetic amplifier also has another control winding, wherein said means for applying a portion of a rectified source voltage is connected to one of said control windings, while said means for applying a portion of a rectified load voltage is connected to another of said control windings.

11. A system as defined in claim 9, wherein said means for applying a portion of a rectified source voltage and said means for applying a portion of a rectified load voltage are identical with each other so as to make the system symmetrical relative to the source and the load and therefore functioning in bidirectional manner when the source and the load perform opposite functions.

12. A system as defined in claim 9, wherein said means for applying a portion of a rectified source voltage and said means for applying a portion of a rectified load voltage are constructed so as to provide similar or different current limits in different directions.

13. A system as defined in claim 9, wherein the system is connectable to the source and the load which are of a three-phase four-wire type and a source neutral is connectable to a load neutral.

14. A system as defined in claim 9, wherein the system is connectable to the source and the load which are of a three-phase type.

15. A system as defined in claim 9, wherein the system is connectable to the source and the load which are of a symmetrical three-phase type.

\* \* \* \* \*